United States Patent
Kotake (10) Patent No.: US 8,427,681 B2
(45) Date of Patent: Apr. 23, 2013

(54) COMPUTER READABLE STORAGE MEDIUM FOR STATUS INDICATION AND A COMPUTER TO DISPLAY THE STATUS

(75) Inventor: Kanako Kotake, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 529 days.

(21) Appl. No.: 12/725,926

(22) Filed: Mar. 17, 2010

(65) Prior Publication Data

US 2010/0265538 A1 Oct. 21, 2010

(30) Foreign Application Priority Data

Apr. 17, 2009 (JP) ................................. 2009-100740

(51) Int. Cl.
*G06F 3/12* (2006.01)
(52) U.S. Cl.
USPC ........... 358/1.15; 358/1.1; 358/1.14; 358/434
(58) Field of Classification Search .................... 358/1.1, 358/1.14, 1.15, 1.16, 400, 401, 406, 434, 358/437, 296
See application file for complete search history.

(56) References Cited

U.S. PATENT DOCUMENTS 5,930,524 A 7/1999 Sasaki

FOREIGN PATENT DOCUMENTS

| JP | 9-319549 (A) | | 12/1997 |
|---|---|---|---|
| JP | 2002202695 A | * | 7/2002 |
| JP | 2003-108355 | | 4/2003 |
| JP | 2007-251076 A | | 9/2007 |

* cited by examiner

*Primary Examiner* — Thomas D Lee
(74) *Attorney, Agent, or Firm* — Scully, Scott, Murphy & Presser, PC (57) ABSTRACT

A computer readable storage medium storing computer readable instructions to control a computer connected with a communication device is provided. The computer readable instructions control the computer to execute steps of storing correspondence information, which defines correspondence between types of a plurality of functions in the communication device and contents of status information indicating possible conditions of the communication device, detecting a type of a function activated in the communication device amongst the plurality of functions, receiving status information transmitted from the communication device, extracting content of the status information corresponding to the detected type of the function with reference to the stored correspondence information, rearranging a display order to have the extracted content of the status information in a higher position within the contents of the received status information, and displaying the received contents of the status information in the rearranged order in a display unit.

6 Claims, 6 Drawing Sheets

| REARRANGEMENT ORDER | PRINTING ERROR | SCANNING ERROR | FAX ERROR |
|---|---|---|---|
| 1 | Out of ink | Original document jam | Original document jam |
| 2 | Out of paper | Top cover open | Set telephone line |
| 3 | Original document jam | Memory full | Line disconnected |
| 4 | No cartridge | – | Communication error |
| 5 | Paper jam | – | Connect telephone line |
| 6 | Unable to feed paper | – | Memory full |
| 7 | Memory full | – | – |
| 8 | Ink will run out | – | – |

COMPUTER READABLE STORAGE MEDIUM FOR STATUS INDICATION AND A COMPUTER TO DISPLAY THE STATUS

CROSS REFERENCE TO RELATED APPLICATION

This application claims priority from Japanese Patent Application No. 2009-100740, filed on Apr. 17, 2009, the entire subject matter of which is incorporated herein by reference.

BACKGROUND

1. Technical Field

An aspect of the present invention relates to a computer readable storage medium for a computer capable of displaying operational status information concerning a device such as a printer.

2. Related Art

A device driver, which is a computer program to be run on a personal computer (PC) to monitor and manipulate behaviors of a device (e.g., a printer) connected to the PC, is known. The device driver receives operational status and conditions of the device and displays information concerning the status through a display of the PC.

SUMMARY

A device may include a plurality of different functions. For example, a multifunction peripheral device having functions such as a printing function and a scanning function is known. When an operational error occurs in the device, and the error needs to be recognized by a user, the error may be notified to the user, for example, by the PC displaying a message concerning the error in a display. In this regard, when the device is equipped with other functions than the function currently being used by the user, the device may also notify the user of the other error. However, the user may not be aware of the other error concerning the unused function, and the error condition may remain untreated.

The present invention is advantageous in that a computer readable storage medium to store computer readable instructions that control a computer to present errors occurring in a device effectively and prevent such errors from being left untreated, and the computer to execute the instructions to control the device, are provided.

According to an aspect of the present invention, a computer readable storage medium storing computer readable instructions to control a computer is provided. The computer has a display unit and is connected with a communication device to communicate. The communication device has a plurality of functions. The computer readable instructions control the computer to execute steps of storing correspondence information, which defines correspondence between types of the plurality of functions in the communication device and contents of status information indicating possible conditions of the communication device, detecting a type of a function activated in the communication device amongst the plurality of functions, receiving status information, which includes contents indicating conditions of the communication device transmitted from the communication device, extracting content of the status information corresponding to the detected type of the function activated in the communication device amongst the contents in the received status information with reference to the stored correspondence information, rearranging a display order, which defines priority of the contents of the received status information to be displayed in the display unit, to have the extracted content of the status information in a higher position within the contents of the received status information, and displaying the received contents of the status information in the rearranged order in the display unit.

In the above computer readable storage medium, the plurality of functions in the communication device may include functions to serve as a telephone, a facsimile transmission/receiver, a scanner, and a printer. When the communication device is a multifunction peripheral device with such functions, and when the type of the function running active in the communication device is detected, the computer detects as to whether the activated function is, for example, a printing function or a scanning function. The status information to be received in the computer may indicate, for example, an error condition and operation progress of the communication device. The contents of status information indicating possible conditions of the communication device may be, for example, ink running out, paper running out, and paper jam for the printing function. For the scanning function, the contents of status information indicating possible conditions of the communication device may be, for example, a cover of a flatbed being open. The correspondence between types of the plurality of functions in the communication device and the contents of status information indicating possible conditions of the communication device may be prepared by a user preliminarily. When the contents of the status information transmitted from the communication device are displayed in the display order, for example, the contents in higher levels in the display order may be displayed at upper positions in the display unit. Alternatively, the contents within predetermined higher levels in the display order may be exclusively displayed in the display unit. Accordingly, the contents in the higher levels in the display order are displayed preferentially over the contents in lower levels.

In the above computer, for example, when the content indicating an event occurring in the printing function and the content of the status information indicating an event occurring in the scanning function are received, and when the printing function running active in the communication device is detected in the computer, the content of the status information indicating the event occurring in the printing function is extracted. Further, for example, when the display order indicates that the content in the status information concerning the printing function is at a higher position, the content in the status information concerning the printing function is displayed preferentially over the other contents in the received status information concerning the other functions in the communication device.

According to the above behaviors of the computer controlled by the instructions stored in the computer readable storage medium, the display order can be rearranged so that the content in the status information corresponding to the function running active in the communication device is displayed preferentially in the display unit. Therefore, even when the computer receives the status information concerning a plurality of functions in the communication device, the conditions of the active functions can be preferentially presented to the user. Accordingly, the user's failure to overlook important events concerning the active functions can be avoided.

According to another aspect of the present invention, a computer to be connected with a communication device having a plurality of functions and a storage unit to store correspondence information is provided. The correspondence information defines correspondence between types of the plurality of functions in the communication device and contents of status information indicating possible conditions of the communication device. The computer includes a display unit, a detecting unit to detect a type of a function activated in the communication device amongst the plurality of functions, a receiver unit to receive status information, which includes contents indicating conditions of the communication device transmitted from the communication device, an extractor unit to extract content of the status information corresponding to the detected type of the function activated in the communication device amongst the contents in the received status information with reference to the correspondence information, and a rearrangement unit to rearrange a display order, which defines priority of the contents of the received status information to be displayed in the display unit, to have the extracted content of the status information in a higher position within the contents of the received status information. The display unit displays the contents of the received status information in the rearranged order.

According to the above computer, the display order can be rearranged so that the content in the status information corresponding to the function running active in the communication device is displayed preferentially in the display unit. Therefore, even when the computer receives the status information concerning a plurality of functions in the communication device, the conditions of the active functions can be preferentially presented to the user. Accordingly, the user's failure to overlook important events concerning the active functions can be avoided.

DETAILED DESCRIPTION

Hereinafter, an embodiment according to the present invention will be described with reference to the accompanying drawings.

Figure 1:
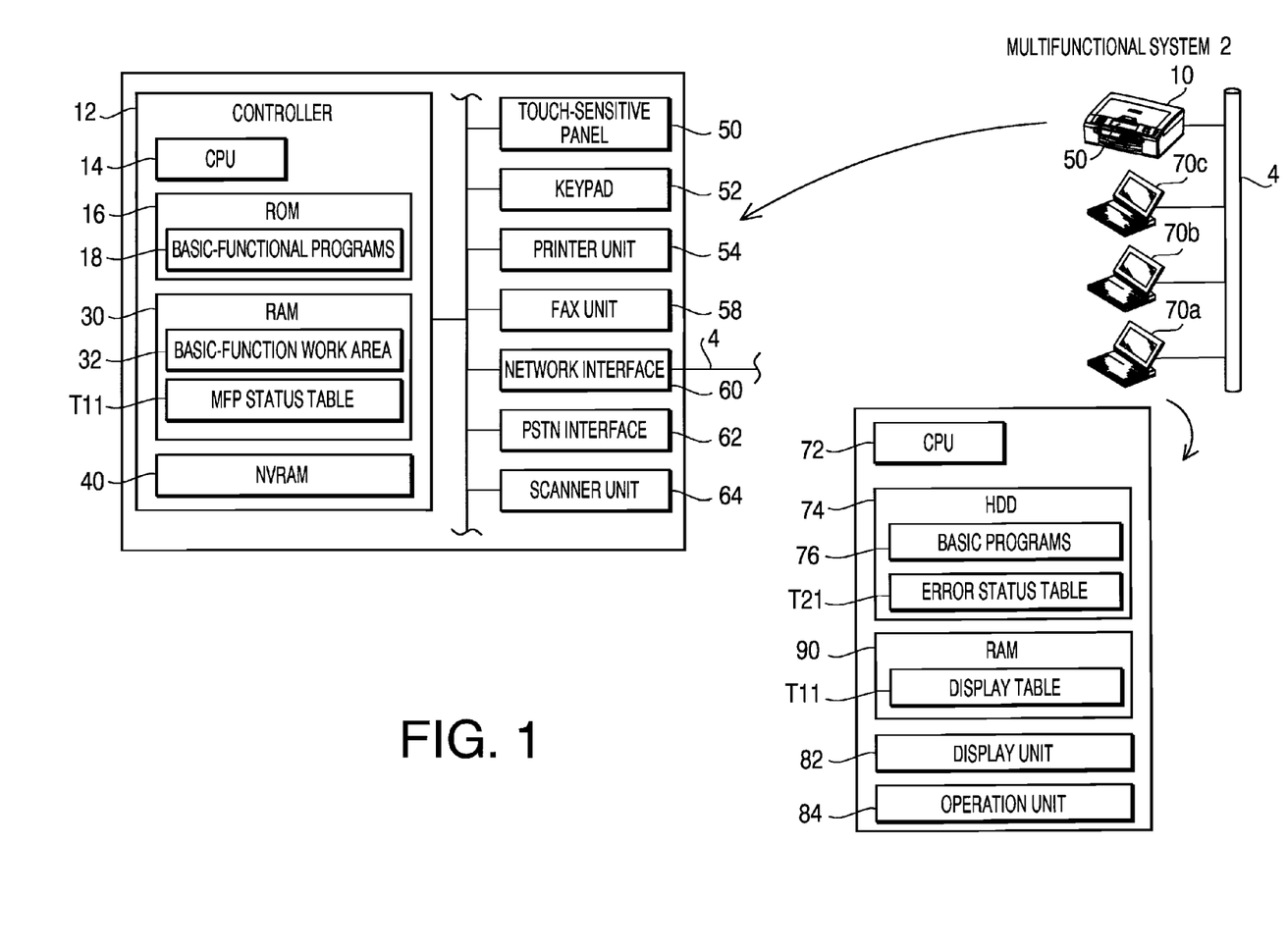
FIG. 1 is a block diagram to illustrate a multifunctional system according to embodiments of the present invention.

An overall configuration of a multifunctional system 2 according to the present embodiment will be described with reference to FIG. 1. The multifunctional system 2 includes an MFP (multifunctional peripheral) 10, PC 70a, and a PC 70c, which are connected with one another through a LAN (local area network) 4 to communicate with one another.

The MFP 10 includes a controller 12, a touch-sensitive panel 50, a key pad 52, a printer unit 54, a FAX (facsimile) unit 58, a network interface 60, a PSTN (public switched telephone network) interface 62, and a scanner unit 64. The network interface 60 is connected to the LAN 4. The controller 12 includes a CPU 14, a ROM 16, a RAM 30, and an NVRAM 40.

The CPU 14 processes various kinds of operations in accordance with programs stored in the ROM 16 and developed in the RAM 30. The ROM 16 stores basic-function programs 18, which include, for example, controlling programs to control fundamental behaviors of the MFP 10. The basic-function programs 18 include, for example, controlling programs to manipulate the printer unit 54 and the FAX unit 58. The CPU 14 monitors status of the MFP 10 and stores information concerning the status in a multifunctional status table T1.

The RAM 30 has a number of storage areas, which include a basic-function work area 32 and an area for an MFP status table T1. In the basic-function work area 32, various kinds of data created within the MFP 10 conducting operations according to the basic-function programs 18 is stored.

Figure 4:
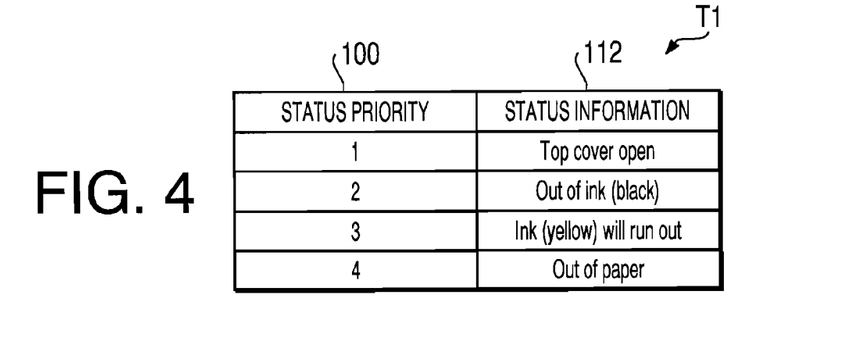
FIG. 4 illustrates an MFP status table according to the embodiments of the present invention.

The MFP status table T1, as illustrated in FIG. 4, stores information concerning status priority 100 and status information 112. The status priority 100 indicates priority levels of contents in the status information 112 assigned by the MFP 100. The priority of the contents of the status information 112 may be assigned, for example, by the CPU 14 referring to a list of status information 112 stored in a predetermined order in the NVRAM 40.

The status information 112 includes contents indicating various types of status and conditions of operational events occurring in the MFP 10. The contents in the status information 112 indicate, for example, an error condition occurring in the MFP 10 and progress of an operation being conducted in the MFP 10. Error conditions to be indicated in the status information 112 include, for example, a printing error concerning the printer unit 54 and a scanning error concerning the scanner unit 64. In FIG. 4, the error conditions indicating the printing error (i.e., "Out of ink (black)," "Ink (yellow) will run out," and "Out of paper") and the scanning error (i.e., "Top cover open") are stored in the MFP status table T1.

An overall configuration of the PC 70a will be described below. In the present embodiment, the PCs 70b and 70c are in similar configuration to that of the PC 70a; therefore, detailed description of the PCs 70b and 70c will be represented by that of the PC 70a. The PC 70a includes an HDD (hard disk drive) 74, a display unit 82, an operation unit 84, and a RAM 90. The display unit 82 displays various kinds of information to be viewed by a user. The operation unit 84 includes a keyboard and a mouse, which are handled by the user to enter various kinds of instructions and information in the PC 70a.

The HDD 74 has a number of storage areas including areas for basic programs 76 and an error status table T21. The basic programs 76 are programs to control fundamental behaviors of the PC 70a. The basic programs 76 include, for example, a status monitor for the MFP 10. The status monitor is a program to inquire about operational status of the MFP 10 periodically to monitor the operational status of the MFP 10. The HDD 74 further stores information concerning operational settings of the PC 70a, such as allowance for the status monitor to operate in a first mode, which will be described later in detail.

The HDD 74 further has a device driver for the MFP 10 installed. The device driver for the MFP 10 is a software program to be installed in the HDD 74 to control the MFP 10. The device drivers include a printer driver to control the printer unit 54, a scanner driver to control the scanner unit 64, and a FAX driver to control the FAX unit 58 in the MFP 10. When programs including the device driver are installed in the PC 70a, files including programs and data which constitute the device driver, stored in a memory medium (not shown) such as a CD-ROM, are duplicated, and the duplicated files are stored in a storage device (e.g., the HDD 74) in the PC 70a. Thus, the programs are setup in a condition to be activated. Upon installation, a suitable device driver to be installed for the functions in the MFP 10 may be selected by the user. For example, when the user prefers to control the printer unit 54 of the MFP 10 amongst the other functions through the PC 70a, the user may select to install specifically the printer driver alone in the PC 70a.

Figure 6:
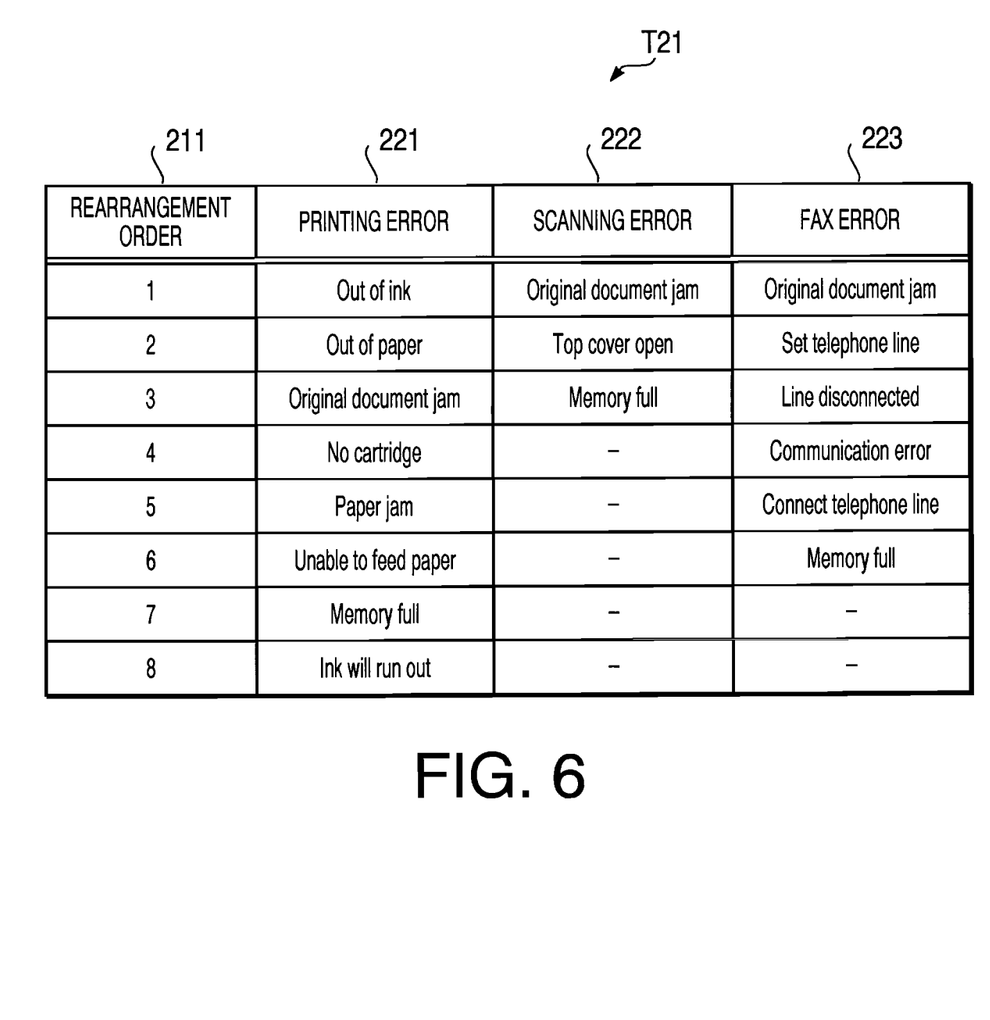
FIG. 6 illustrates an error status table according to the embodiment of the present invention.

The error status table T21, as illustrated in FIG. 6, stores information concerning rearrangement order 211 and contents of possible error status, which are grouped into printing errors 221, scanning errors 222, and FAX errors 223, to be associated with each other. The contents of possible error status indicate errors which may occur in the MFP 10. In the error status table T21, the contents of the error status are ranked to have rearrangement order 211 respectively. The contents of the error status are ranked in an order of the rearrangement order 211, which indicates priority of the error status. A smaller number in the rearrangement order 211 indicates a higher priority, and a larger number in the rearrangement order 211 indicates a lower priority. The error contents in the error status table T21 with a higher level of importance is given a higher priority. An error condition of the MFP 10 with a higher level of importance may be, for example, a printing error 221, in which the printer unit 54 cannot continue printing an image. The rearrangement order 211 may be defined preliminarily by a user.

Figure 5A:
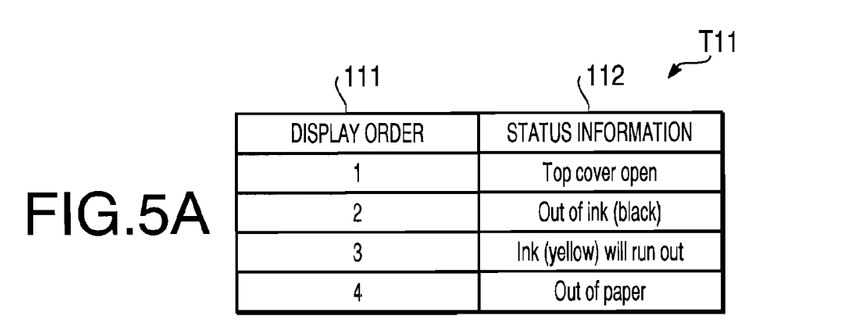
FIGS. 5A-5C illustrate status information tables according to the embodiment of the present invention.
Figure 5B:
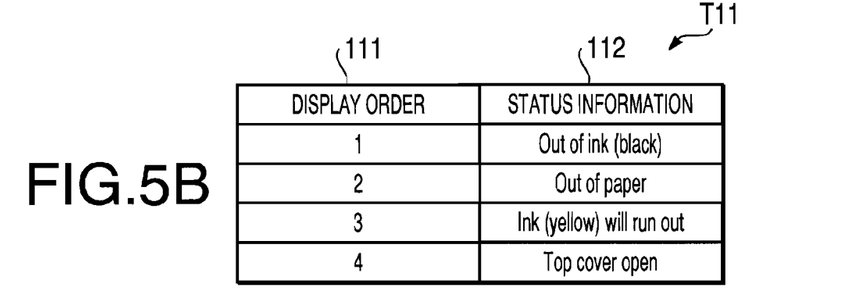
Figure 5C:
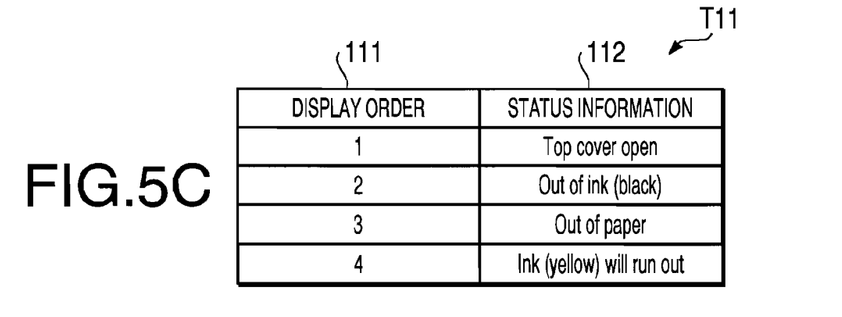

The RAM 90 has an area to store a display table T11. The display table T11, as shown in FIGS. 5A-5C, stores information concerning a display order 111 and the contents of the status information 112 being associated with each other. The display order 111 indicates an order, in which the contents of the status information 112 are arranged to be displayed in the display unit 82. The display table T11 stores the contents of the status information 112, which are provided by the MFP 10.

The RAM 90 further has areas to store an in-printing flag and an in-scanning flag. The in-printing flag set to one (1) indicates that the printer driver is running active whilst the in-printing flag set to zero (0) indicates that the printer driver is inactive. Therefore, by referring to the in-printing flag, the CPU 14 of the PC 70a recognizes as to whether the MFP 10 is in a printing operation or not. The in-scanning flag set to one (1) indicates that the scanner driver is running active whilst the in-scanning flag set to zero (0) indicates that the scanner driver is inactive. Therefore, by referring to the in-scanning flag, the CPU 14 of the PC 70a recognizes as to whether the MFP 10 is in a scanning operation or not.

Figure 2:
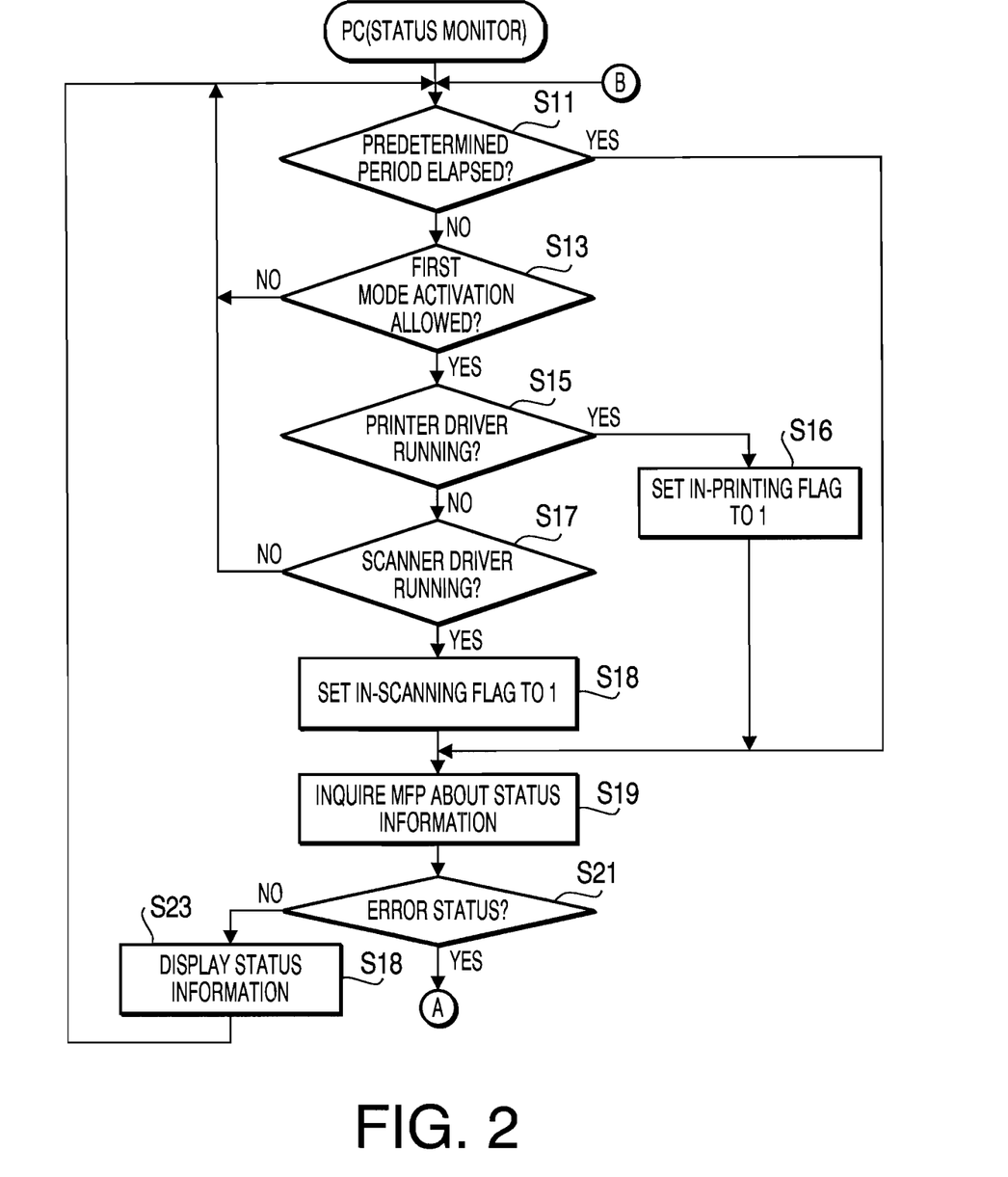
FIG. 2 is a flowchart to illustrate behaviors of a status monitor according to the embodiments of the present invention.
Figure 3:
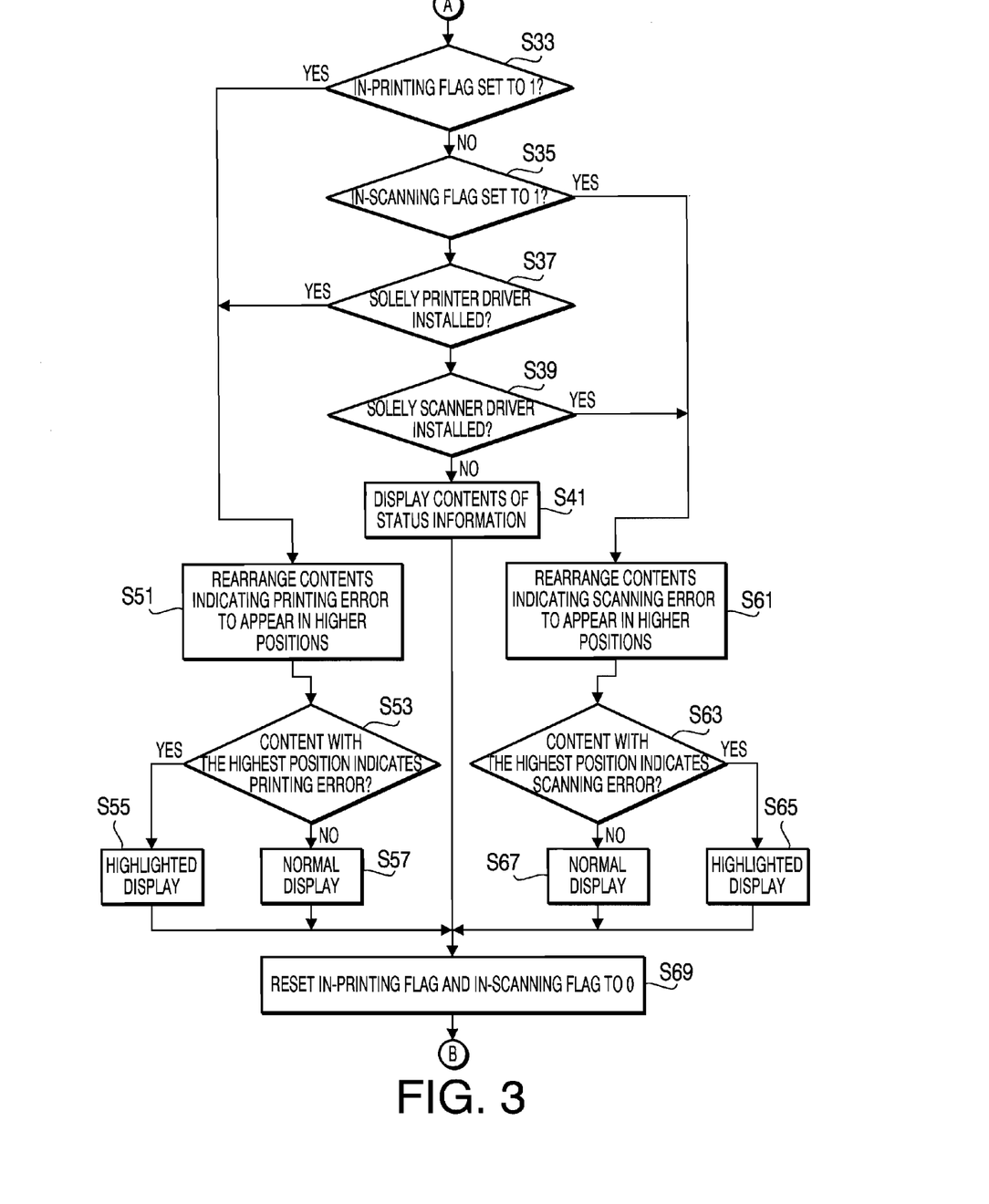
FIG. 3 is a flowchart to illustrate behaviors of the status monitor according to the embodiment of the present invention.

A status displaying operation to be conducted by the status monitor in the PC 70a will be described with reference to FIGS. 2 and 3. The status display operation in the PC 70a includes a first mode, in which the operational status of the MFP 10 is displayed when the MFP 10 is in use for an operation, and a second mode, in which the operational status of the MFP 10 is displayed when the MFP 10 is in and not in use for an operation. The status display operation of the PC 70a may be activated in the first mode or in the second mode, and allowance of the first mode in the status display operation may be preliminarily determined by the user. The setting of the first mode may be stored in the HDD 74.

When the operation starts, in S11, the status monitor in the PC 70a judges as to whether a predetermined time period has elapsed. A length of the predetermined time period may be set by a user. If the predetermined time period has elapsed (S11: YES), the flow proceeds to S19. If the predetermined time period remains (S11: NO), the flow proceeds to S13.

In S13, the status monitor judges as to whether the first mode is allowed in the status display operation with reference to the information concerning the setting of the first mode in a predetermined area in the HDD 74. When the status monitor judges that the first mode is not allowed (S13: NO), the flow returns to S11. When the status monitor judges that the first mode is allowed (i.e., the status of the MFP 10 is monitored in the first mode) (S13: YES), the flow proceeds to S15.

In S15, the status monitor judges as to whether the printer driver is active. The judgment is made by the status monitor monitoring the PC 70a. For example, when a print setting window for the printer driver is displayed through the display unit 82, the status monitor may determine that the printer driver is active. When the printer driver is active (S15: YES), the flow proceeds to S16. In S16, the status monitor sets the in-printing flag to 1. The flow further proceeds to S19. When the printer driver is not active (S15: NO), the flow proceeds to S17.

In S17, the status monitor judges as to whether the scanner driver is active. The judgment is made by the status monitor monitoring the PC 70a. For example, when a scanner setting window for the scanner driver is displayed through the display unit 82, the status monitor may determine that the scanner driver is active. When the scanner driver is active (S17: YES), the flow proceeds to S18. In S18, the status monitor sets the in-scanning flag to 1. The flow further proceeds to S19. When the scanner driver is not active (S17: NO), the flow returns to S11.

In S19, the status monitor inquires the MFP 10 about the status information 112 and receives the status information 112 and the status priority 100 transmitted from the MFP 10. The status monitor assigns display order 111 in the order as indicated in the status priority 100 to the contents included in the received status information 112. Further, the status monitor stores the display order 111 and the contents of the status information 112 in association with each other in the display table T11.

In S21, the status monitor judges as to whether the contents of the status information 112 provided by the MFP 10 indicates error status. The judgment may be made, for example, by the status monitor referring to the error status table T21, in which the list of errors is stored, and searches for the current condition of the MFP 10 in the error status table T21. If the current condition of the MFP 10 indicated in the received status information 112 is not error status (S21: NO), the flow proceeds to S23. In S23, the status monitor displays a dialog box in the display unit 82 to present the current condition indicated in the status information 112 to the user. The condition to be displayed in the dialog box may be, for example, progress of a printing operation running in the MFP 10. In S21, if the condition of the MFP 10 indicated in the received status information 112 is error status (S21: YES), the flow proceeds to S33 (FIG. 3).

In S33, the status monitor judges as to whether the in-printing flag in the RAM 90 is set to 1. If the in-printing flag indicating 1 is detected (S33: YES), which indicates that the printer driver is active when the first mode is allowed and that a printing operation is running in the MFP 10, the flow proceeds to S51. If the in-printing flag is not set to 1 (S33: NO), the flow proceeds to S35.

In S35, the status monitor judges as to whether the in-scanning flag in the RAM 90 is set to 1. If the in-scanning flag indicating 1 is detected (S33: NO), which indicates that the scanner driver is active when the first mode is allowed and that a scanning operation is running in the MFP 10, the flow proceeds to S61. If the in-scanning flag is not set to 1 (S35: NO), the flow proceeds to S37.

In S37, the status monitor judges as to whether the PC 70*a* has solely the printer driver amongst the other device drivers installed. The judgment may be made, for example, by the status monitor referring to a list of programs installed in the PC 70*a*. The list of installed programs is administrated by, for example, the operating system (OS) of the PC 70*a*. If solely the printer driver being installed in the PC 70*a* is detected (S37: YES), it is determined that the status display operation is running in the second mode. The flow proceeds to S51. If the printer driver is not a sole device driver installed in the PC 70*a* (S37: NO), the flow proceeds to S39.

In S39, the status monitor judges as to whether the PC 70*a* has solely the scanner driver amongst the other device drivers installed. If solely the scanner driver being installed in the PC 70*a* is detected (S39: YES), it is determined that the status display operation is running in the second mode. The flow proceeds to S61. If the scanner driver is not a sole device driver installed in the PC 70*a* (S37: NO), the contents in the display table T11 are not rearranged. The flow proceeds to 41.

In S41, the status monitor maintains the arrangement of the contents of the status information 112 stored in the display table T11 in the display order 111 and displays the contents of the status information 112 in the maintained order through the display unit 82. Thus, in S41, the current display order 111 is equivalent to the status priority 110.

In S51, the status monitor rearranges the contents of the status information 112 in the display table T11 to have the contents indicating printing errors to be prioritized based on the error status table T21. In particular, the status monitor refers to the error status table T21 and extracts the contents in the status information 112 in the display table T11 indicating the printing errors. The extracted contents of the status information 112 are arranged with reference to the rearrangement order 211 in the error status table T21 so that the content having a higher level of priority in the error status table T21 is assigned with a higher level of display order 111 to be in a higher position in the display table T11.

In S53, the status monitor judges as to whether the content with a highest level of display order 111 indicates a printing error. The content having the highest level of display order 111 indicates most critical condition amongst the contents in the status information 112 stored in the display table 111. When the content having the highest level of display order 111 indicates a printing error (S53: YES), the flow proceeds to S55. In S55, the status monitor displays the rearranged contents of the status information 112 in the display table T11, which are rearranged in accordance with the display order 111, through the display unit 82. When the contents are displayed according to the display order 111, for example, the contents having higher level of display order 111 may be displayed in the higher positions in a screen of the display unit 82. Alternatively, for example, exclusively a predetermined number of contents within the limited higher levels of display order 111 may be displayed through the display unit 82. Thus, the contents of the status information 112 with the higher level of display order 111 are preferentially displayed through the display unit 82. Further, the status monitor displays the content with the highest level of display order 111 to be highlighted. The highlighted content may appear, for example, in a bold face, in a larger font, or in a different color other than a normal color (e.g., black), in the display unit 82.

In S53, when the content having the highest level of display order 111 does not indicate a printing error (S53: NO), the flow proceeds to S57. In S57, the status monitor displays the content of the status information 112 in the display table T11 normally without highlight through the display unit 82. In the normal display, the contents may appear, for example, in a fine face or in black.

In S61, the status monitor rearranges the contents of the status information 112 in the display table T11 to have the contents indicating scanning errors to be prioritized based on the error status table T21 so that the content having a higher level of priority in the error status table T21 is assigned with a higher level of display order 111 to be in a higher position in the display table T11.

In S63, the status monitor judges as to whether the content with a highest level of display order 111 indicates a scanning error. When the content having the highest level of display order 111 indicates a scanning error (S63: YES), the flow proceeds to S65. In S65, the status monitor displays the rearranged contents of the status information 112 in the display table T11, which are rearranged in accordance with the display order 111, through the display unit 82. In this regard, the status monitor displays the content with the highest level of display order 111 to be highlighted.

In S63, when the content having the highest level of display order 111 does not indicate a scanning error (S63: NO), the flow proceeds to S67. In S67, the status monitor displays the content of the status information 112 in the display table T11 normally without highlight through the display unit 82.

Following any of S55, s57, S65, and S67, in S69, the status monitor resets the in-printing flag and the in-scanning flag to 0. The flow returns to S11 (see FIG. 2).

A first example of the behaviors of the status monitor will be described below. In the example, the status monitor in the PC 70*a* is allowed to operate in the first mode, and the printer driver is running in the PC 70*a*. Further, it is assumed that the printer driver is active in the PC 70*a*, and the error conditions indicated in the contents of the status information 112 as illustrated in FIG. 4 occurred in the MFP 10.

Before the predetermined time period elapses (S11: NO), in S13, the status monitor determines that the first mode is allowed in the status display operation (S13:YES). In S15, the status monitor determines that the printer drive is active (S15: YES) and, in S16, sets the in-printing flag to 1. In S19, the status monitor inquires the MFP 10 about the status information 112. Further, the status monitor assigns the display order 111 as indicated in the status priority 100 to the contents of the status information 112 to the contents in the status information 112 received from the MFP 10. The status monitor stores the contents of the status information 112 with the assigned display order 111 in the display table T11. The display table T11 with the display order 111 and the contents of the status information 112 stored in S19 appears as illustrated in FIG. 5A.

In S21, the status monitor determines that the contents of the status information 112 provided by the MFP 10 indicates error conditions (S21: YES). In S33, the status monitor determines that the in-printing flag in the RAM 90 indicates 1 (S33: YES). Accordingly, in S51, the status monitor rearranges the contents of the status information 112 in the display table T11 to have the contents indicating printing errors to be in higher positions with reference to the error status table T21 (see FIG. 6). In particular, the status monitor extracts the contents indicating the error conditions, which are "Out of ink (black)," "Ink (yellow) will run out," and "Out of paper."

Further, the status monitor searches the error status table T21 for the rearrangement order 211 corresponding to the extracted error conditions, which are #1, #8, and #2. Thus, the status monitor rearranges the extracted content indicating the error conditions with reference to the detected rearrangement order 211 so that the content having the higher level of priority in the error status table 21 is rearranged in the higher position in the display table T11. The display table T11 with the rearranged contents of the status information 112 in S51 now appears as illustrated in FIG. 5B.

Figure 7:
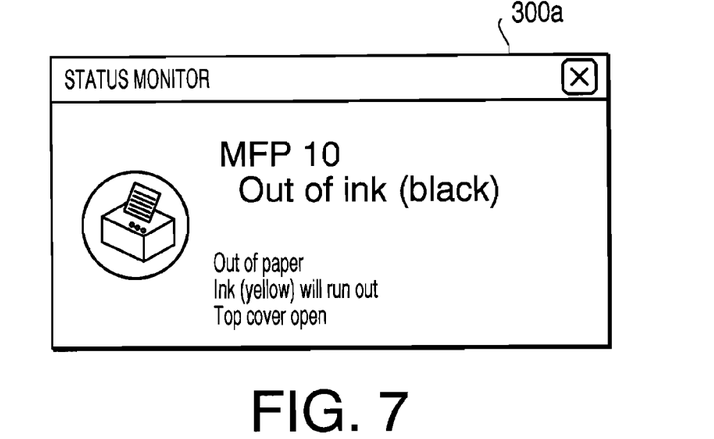
FIG. 7 is an illustrative view of a dialog box to be displayed in a display unit according to the embodiment of the present invention.

In the current display table T11, as shown in FIG. 5B, the content having the highest level of display order 111, which appears in the top row ("Out of ink (black)"), indicates a printing error (S53: YES); therefore, in S55, the content "Out of ink (black)" is highlighted in the display unit 82. A dialog box 300a indicating the contents of the status information 112 is illustrated in FIG. 7. In the dialog box 300a, a plurality of contents of the status information 112 are displayed. The status monitor displays the contents of the status information 112 stored in the display table T11 (see FIG. 5B) in the rearranged order with the contents having higher levels of display order 111 appearing in higher positions. Thus, the contents of the status information 112 indicating printing errors and having the levels #1 through #3 in the display order 111 are arranged in the higher positions to be displayed in the dialog box 300a in the display unit 82 than a position of the content of the status information 112 indicating a scanning error, which has the level #4 in the display order 111. Further, the content "Out of ink (black)" having the highest level #1 of the display order 111 is presented in bold face and in larger font to be highlighted whilst the remaining contents in the status information 112 having the levels #2-#4 are presented in normal face and in black. In S69, the status monitor resets the in-printing flag and the in-scanning flag to 0.

A second example of the behaviors of the status monitor will be described below. In the second example, the status monitor in the PC 70a is not allowed to operate in the first mode, and solely the scanner driver is installed in the HDD 74 of the PC 70a. Further, it is assumed that the scanner driver is inactive in the PC 70a, and the error conditions indicated in the contents of the status information 112 as illustrated in FIG. 4 occurred in the MFP 10.

When the predetermined time period has elapsed (S11: YES), in S19, the status monitor inquires the MFP 10 about the status information 112. Further, the status monitor assigns the display order 111 as indicated in the status priority 100 to the contents of the status information 112 to the contents in the status information 112 received from the MFP 10. The status monitor stores the contents of the status information 112 with the assigned display order 111 in the display table T11. The display table T11 with the display order 111 and the contents of the status information 112 stored in S19 appears as illustrated in FIG. 5A.

In S21, the status monitor determines that the contents of the status information 112 provided by the MFP 10 indicates error conditions (S21: YES). In S33 and S35, the status monitor determines that neither the in-printing flag nor the in-scanning flag in the RAM 90 indicates 1 (S33: NO, S35: NO). In S39, the status monitor determines that the PC 70a has solely the scanner driver installed in the HDD 74 (S37: NO, S39: YES). In S61, the status monitor rearranges the contents of the status information 112 in the display table T11 to have the contents indicating a scanning error to be in higher positions in the in the display table T11. In particular, the status monitor extracts the content indicating the scanning error, which is "Top cover open" and searches the error status table T21 for the rearrangement order 211 corresponding to the extracted error condition, which is #2. Thus, the status monitor rearranges the extracted content indicating the error condition with reference to the detected rearrangement order 211 so that the content having the highest level of priority in the error status table 21 is rearranged in the highest position in the display table T11. The display table T11 with the rearranged contents of the status information 112 in S61 now appears as illustrated in FIG. 5C.

In the current display table T11, as shown in FIG. 5C, the content having the highest level of display order 111, which appears in the top row ("Top cover open"), indicates a scanning error (S63: YES); therefore, the content "Top cover open" is highlighted in the display unit 82. The status monitor displays the contents of the status information 112 stored in the display table T11 (see FIG. 5C) in the rearranged order with the contents having higher levels of display order 111 appearing in higher positions. Thus, the content of the status information 112 indicating a scanning error is arranged in the higher position to be displayed in the dialog box in the display unit 82 than positions of the contents of the status information 112 indicating printing errors. In S69, the status monitor resets the in-printing flag and the in-scanning flag to 0.

A third example of the behaviors of the status monitor will be described below. In the third example, the status monitor in the PC 70a is not allowed to operate in the first mode, and the printer driver and the scanner driver are installed in the HDD 74 in the PC 70a. Further, it is assumed that neither the printer driver nor the scanner driver are active in the PC 70a, and the error conditions indicated in the contents of the status information 112 as illustrated in FIG. 4 occurred in the MFP 10.

The flow of behaviors of the status monitor in S11-S37 is similar to that of the second example described above; therefore, description thereof is omitted. In S37, the status monitor determines that the printer driver is not a sole device driver installed in the PC 70a (S37: NO). Further in S39, the status monitor determines that the scanner driver is not a sole device driver installed in the PC 70a (S39: NO). Accordingly, the status monitor does not rearrange the contents of the status information 112 in the display table T11 but remains the contents as stored in the display table T11 illustrated in FIG. 5A. In S41, the status monitor maintains the arrangement of the contents of the status information 112 stored in the display table T11 in the display order 111 and displays the contents of the status information 112 in the maintained order through the display unit 82. Thus, in S41, the current display order 111 is equivalent to the status priority 110.

According to the above embodiment, the status monitor in the PC 70a detects active functions amongst a plurality of functions including the printer function and the scanner function provided to the MFP 10. Thus, the status monitor rearranges the display order 111 of the contents in the display table T11 so that the contents of the status information 112 corresponding to the active functions are displayed in the display unit 82 preferentially over contents of the status information 112 corresponding to inactive functions. Therefore, even when the PC 70a receives the status information 112 concerning a plurality of functions, the conditions of the active functions can be preferentially presented to the user. Accordingly, the user's failure to overlook important events concerning the active functions can be avoided.

Further, the status monitor in the PC 70a displays the contents of the status information 112 with the higher levels of display order 111, i.e., the critical conditions of the active functions, to be highlighted. Therefore, the user's failure to overlook the critical conditions of the active functions can be securely avoided.

Although examples of carrying out the invention has been described, those skilled in the art will appreciate that there are numerous variations and permutations of the a computer readable storage medium containing computer readable instructions and a computer that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

Figure 8:
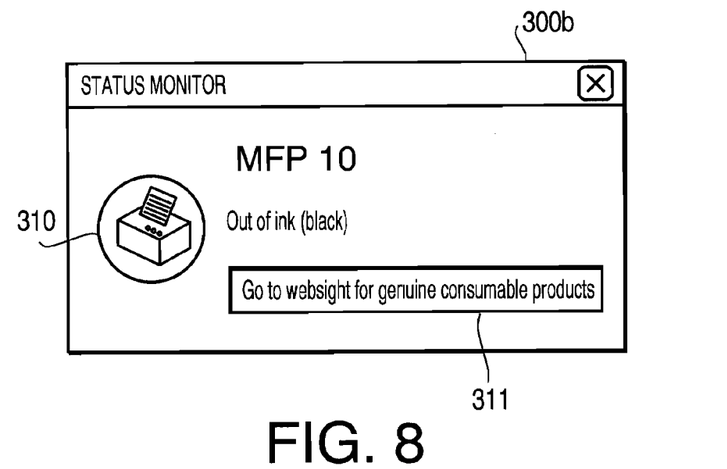
FIG. 8 is an illustrative view of a dialog box to be displayed in the display unit according to the embodiment of the present invention.

For example, the entire contents of the status information 112 in the display table T11 may not necessarily be included in the dialog box to be displayed. A predetermined number of the contents of the status information 112 in higher positions in the display order 111 may be extracted to be displayed in the dialog box. The predetermined number of the contents to be extracted may be determined according to a size of a displayable area in the dialog box. For example, when the conditions described in the display table T11 shown in FIG. 5B occur in the MFP 10, and content in the highest position in the display table T11 is extracted, solely the content "Out of ink (black)" is displayed in the dialog box 300b, which is shown in FIG. 8.

For another example, in the above embodiment, the content of the status information 112 in the highest position in the display order 111 in the display table T11 is highlighted in the dialog box. However, a predetermined number of the contents in the status information 112 in higher positions may be highlighted in the dialog box. Alternatively or additionally, all the contents in the status information 112 indicating the conditions occurring in the functions active in the MFP 10 may be highlighted.

Further, highlight of the contents of the status information 112 may not necessarily be expressed in difference in styles of the font, but may be represented in icons. When, for example, the content of the status information 112 indicting an event occurring in the function running active in the MFP 10 is presented, an icon 310 (see FIG. 8) in the dialog box 300b representing the function running active in the MFP 10, may be displayed in red. Further, when content of the status information 112 indicating an event occurring in a function irrelevant to the function running active in the MFP 10 is presented, an icon representing the irrelevant function may be displayed in, for example, yellow.

Furthermore, the dialog box to present the status information 112 may include other information in addition to the status information 112. The additional information may be, for example, presented in a form of a button 311 (see FIG. 8), which can be operated by the user according to the contents of the status information 112 being displayed in the dialog box.

Figure 9:
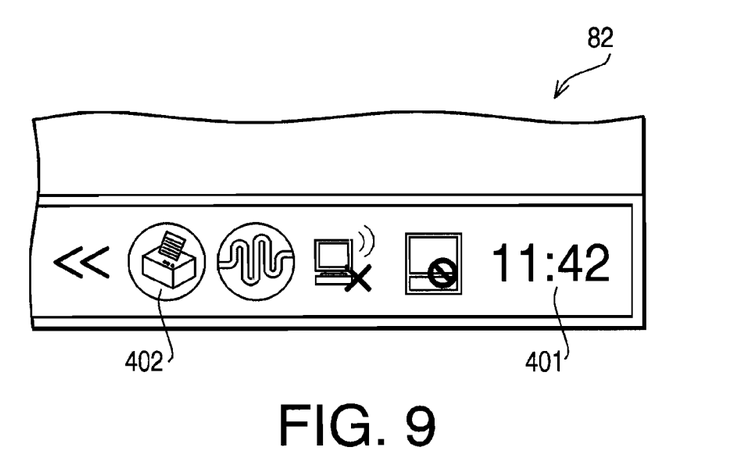
FIG. 9 is an illustrative view of a task tray to be displayed in the display unit according to the embodiments of the present invention.

Moreover, the contents of the status information 112 may not necessarily be presented in text in the dialog box, but may be, for example, represented in icons 402 arranged in a task tray 401, which is provided at a bottom of a screen of the display unit 82. When the user clicks on the icon 402 representing the content of the status information 112, a dialog box with the content of the status information 112 may be displayed in the screen of the display unit 82. Thereby, the user is allowed to select as to whether the dialog box is displayed so that the displayable area in the display unit 82 can be effectively used.

Furthermore, the icons 402 arranged in the task tray 401 may be highlighted. For example, when the icon 402 represents the content of the status information 112 concerning the function activated in the MFP 10, the icon 402 may be displayed in red. Meanwhile, when the icon 402 represents the content of the status information 112 irrelevant to the function running active in the MFP 10, the icon 402 may be displayed in yellow.

In the above embodiment, the printing function and the scanning function represent the functions to be activated in the MFP 10. However, the functions are not limited to those, but may be any function, e.g., facsimile function, to be used in the MFP 10.

What is claimed is:

1. A non-transitory computer readable storage medium storing computer readable instructions to control a computer, which has a display unit and is connected with a communication device to communicate, the communication device having a plurality of functions, to execute steps of:
   storing correspondence information, which defines correspondence between types of the plurality of functions in the communication device and contents of status information indicating possible conditions of the communication device;
   controlling each function of the communication device according to a device driver, which manipulates the communication device on basis of the function;
   detecting a type of a function activated in the communication device amongst the plurality of functions, on basis of the device driver running active in the computer;
   receiving status information, which includes contents indicating conditions of the communication device transmitted from the communication device;
   extracting content of the status information corresponding to the detected type of the function activated in the communication device amongst the contents in the received status information with reference to the stored correspondence information;
   rearranging a display order, which defines priority of the contents of the received status information to be displayed in the display unit, to have the extracted content of the status information in a higher position within the contents of the received status information; and
   displaying the received contents of the status information in the rearranged order in the display unit.

2. A computer to be connected with a communication device having a plurality of functions and a storage unit to store correspondence information, the correspondence information defining correspondence between types of the plurality of functions in the communication device and contents of status information indicating possible conditions of the communication device, comprising:
   a display unit;
   a control unit configured to control each function of the communication device according to a device driver, which manipulates the communication device on basis of the function;
   a detecting unit configured to detect a type of a function activated in the communication device amongst the plurality of functions on basis of the device driver running active in the computer;
   a receiver unit configured to receive status information, which includes contents indicating conditions of the communication device transmitted from the communication device;
   an extractor unit to extract content of the status information corresponding to the detected type of the function activated in the communication device amongst the contents in the received status information with reference to the correspondence information; and
   a rearrangement unit configured to rearrange a display order, which defines priority of the contents of the received status information to be displayed in the display unit, to have the extracted content of the status information in a higher position within the contents of the received status information;

wherein the display unit is configured to display the contents of the received status information in the rearranged order.

3. A non-transitory computer readable storage medium storing computer readable instructions to control a computer, which has a display unit and is connected with a communication device to communicate, the communication device having a plurality of functions, to execute steps of:

storing correspondence information, which defines correspondence between types of the plurality of functions in the communication device and contents of status information indicating possible conditions of the communication device;

controlling each function of the communication device according to a device driver, which manipulates the communication device on basis of the function;

detecting a type of a function activated in the communication device amongst the plurality of functions, on basis of the device driver being installed in the computer;

receiving status information, which includes contents indicating conditions of the communication device transmitted from the communication device;

extracting content of the status information corresponding to the detected type of the function activated in the communication device in the higher position amongst the contents in the received status information with reference to the stored correspondence information;

rearranging a display order, which defines priority of the contents of the received status information to be displayed in the display unit, to have the extracted content of the status information in a higher position within the contents of the received status information; and displaying the received contents of the status information in the rearranged order in the display unit.

4. A non-transitory computer readable storage medium storing computer readable instructions to control a computer, which has a display unit and is connected with a communication device to communicate, the communication device having a plurality of functions, to execute steps of:

storing correspondence information, which defines correspondence between types of the plurality of functions in the communication device and contents of status information indicating possible conditions of the communication device;

detecting a type of a function activated in the communication device amongst the plurality of functions;

receiving status information, which includes contents indicating conditions of the communication device transmitted from the communication device;

extracting content of the status information corresponding to the detected type of the function activated in the communication device amongst the contents in the received status information with reference to the stored correspondence information;

rearranging a display order, which defines priority of the contents of the received status information to be displayed in the display unit, to have the extracted content of the status information, in a higher position within the contents of the received status information; and displaying the received contents of the status information in the rearranged order in the display unit, wherein the computer-readable instructions control the computer to further execute steps of:

receiving priority levels of the contents in the status information along with the status information, the priority levels being assigned by the communication device and determining priority of the contents in the status information; and maintaining the received priority levels of the contents of the status information and preventing the display order of the contents from being rearranged when the contents of the received status information lacks the content corresponding to the type of the function activated in the communication device.

5. A non-transitory computer readable storage medium storing computer readable instructions to control a computer, which has a display unit and is connected with a communication device to communicate, the communication device having a plurality of functions, to execute steps of:

storing correspondence information, which defines correspondence between types of the plurality of functions in the communication device and contents of status information indicating possible conditions of the communication device;

detecting a type of a function activated in the communication device amongst the plurality of functions;

receiving status information, which includes contents indicating conditions of the communication device transmitted from the communication device;

extracting content of the status information corresponding to the detected type of the function activated in the communication device amongst the contents in the received status information with reference to the stored correspondence information;

rearranging a display order, which defines priority of the contents of the received status information to be displayed in the display unit, to have the extracted content of the status information, in a higher position within the contents of the received status information; and displaying the received contents of the status information in the rearranged order in the display unit;

wherein the storing step includes storing the contents of the status information to be grouped on basis of the type of the function and a rearrangement order, which defines an order of the contents of the status information to be rearranged within the group, within the correspondence information; and wherein the rearranging step includes rearranging the display order of the contents of the status information in accordance with the rearrangement order to have the extracted content of the status information in a group corresponding to the detected type of the function in the higher position within the contents of the received status information.

6. A computer configured to be connected with a communication device having a plurality of functions and a storage unit storing correspondence information, the correspondence information defining correspondence between types of the plurality of functions in the communication device and contents of status information indicating possible conditions of the communication device, comprising:

a display unit;

a detecting unit configured to detect a type of a function activated in the communication device amongst the plurality of functions;

a receiver unit configured to receive status information, which includes contents indicating conditions of the communication device transmitted from the communication device;

an extractor unit configured to extract content of the status information corresponding to the detected type of the function activated in the communication device amongst the contents in the received status information with reference to the correspondence information; and a rearrangement unit configured to rearrange a display order, which defines priority of the contents of the received status information to be displayed in the display unit, to have the extracted content of the status information in a higher position within the contents of the received status information; and wherein the contents of the status information are stored to be grouped on basis of the type of the function and a rearrangement order, which defines an order of the contents of the status information to be rearranged within the group, within the correspondence information; and wherein the contents of the status information is stored to be grouped on basis of the type of the function and a rearrangement order, which defines an order of the contents of the status information to be rearranged within the group, within the correspondence information; and wherein the rearrangement units rearranges the display order of the contents of the status information in accordance with the rearrangement order to have the extracted content of the status information in a group corresponding to the detected type of the function in the higher position within the contents of the received status information;

wherein the display unit is configured to display the contents of the received status information in the rearranged order.

* * * * *